United States Patent
Park et al.

(10) Patent No.: US 7,013,208 B2
(45) Date of Patent: *Mar. 14, 2006

(54) SLIDING INTEGRAL PROPORTIONAL (SIP) CONTROLLER FOR AIRCRAFT SKID CONTROL

(75) Inventors: Duk-Hyun Park, Burbank, CA (US); Robert D. Cook, Valencia, CA (US)

(73) Assignee: Hydro-Air, Inc., Burbank, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 10/754,664

(22) Filed: Jan. 8, 2004

(65) Prior Publication Data

US 2004/0140715 A1 Jul. 22, 2004

Related U.S. Application Data

(63) Continuation of application No. 10/023,210, filed on Dec. 17, 2001, now Pat. No. 6,684,147.

(51) Int. Cl.
*B60B 39/00* (2006.01)

(52) U.S. Cl. .............................. 701/71; 701/70; 701/80; 303/148; 303/149; 303/150; 244/75 R; 244/111; 188/181 T (58) Field of Classification Search ............. 701/70–74, 701/78, 80–83, 3–4; 188/181 R, 181 T; 303/104, 303/109, 148–150, 167, 178; 244/75 R, 111
See application file for complete search history.

(56) References Cited

U.S. PATENT DOCUMENTS

| 4,336,592 A | | 6/1982 | Beck ........................... 701/78 |
| 4,412,291 A | | 10/1983 | Amberg et al. ............... 701/78 |
| 4,679,866 A | | 7/1987 | van Zanten et al. ......... 303/167 |
| 4,715,662 A | | 12/1987 | van Zanten et al. ......... 303/150 |
| 4,940,295 A | * | 7/1990 | Adachi et al. ........... 303/117.1 |
| 4,946,015 A | * | 8/1990 | Browalski et al. .......... 477/186 |
| 5,291,408 A | * | 3/1994 | Thatcher ...................... 701/90 |
| 5,918,951 A | * | 7/1999 | Rudd, III .................... 303/150 |
| 5,951,122 A | * | 9/1999 | Murphy ...................... 303/163 |
| 6,684,147 B1 | * | 1/2004 | Park et al. ..................... 701/71 |

FOREIGN PATENT DOCUMENTS

GB            2 292 195        12/1996

* cited by examiner

Primary Examiner—Jacques H. Louis-Jacques
(74) Attorney, Agent, or Firm—Fulwider Patton Lee & Utecht, LLP (57) ABSTRACT

The sliding, integral, and proportional controller for providing aircraft antiskid braking control includes a reference velocity subsystem, a velocity error ratio subsystem, and a main controller subsystem generating a control command output signal indicative of a command braking pressure. The main controller subsystem includes a one dimensional sliding mode controller subsystem to determine an estimated net wheel torque signal, an adaptive threshold subsystem for generating an adaptive threshold based upon the modified slip ratio signal and a clock signal, integral gain subsystems, a proportional controller subsystem, and a pressure limiter. A method for determining braking efficiency of an aircraft braking system independent of the specific conditions is also provided.

6 Claims, 5 Drawing Sheets

SLIDING INTEGRAL PROPORTIONAL (SIP) CONTROLLER FOR AIRCRAFT SKID CONTROL

RELATED APPLICATIONS

This is a continuation of Ser. No. 10/023,210, filed Dec. 17, 2001, now U.S. Pat. No. 6,684,147.

BACKGROUND OF THE INVENTION

This invention relates generally to aircraft landing gear braking systems, and more particularly concerns an improved system for controlling aircraft brake pressure.

A conventional skid detection system used in aircraft braking systems typically includes a wheel speed transducer for each wheel brake of the wheels of the aircraft, for measuring wheel speed and generating wheel speed signals that are a function of the rotational speed of the brake wheel. The wheel speed signal is typically converted to a signal representing the velocity of the aircraft, and compared with a desired reference velocity, to generate wheel velocity error signals indicative of the difference between the wheel velocity signals from each braked wheel and the reference velocity signal. The output of the velocity comparator is referred to as velocity error. The velocity error signals typically are adjusted by a pressure bias modulator (PBM) integrator, a proportional control unit, and a compensation network, the outputs of which are summed to provide an anti-skid control signal received by the command processor. The PBM integrator in the antiskid loop dictates the maximum allowable control pressure level during braking. When no skid is detected, this integrator allows full system pressure to the brakes.

The conventional PID controller for aircraft brake control systems deals with various conditions such as aerodynamics, landing gear dynamics, $\mu$-slip profile, different landing conditions, and the like. One major problem is that tuning of controller parameters to guarantee high efficiency in different landing conditions and conditions affecting the tire-runway coefficient of friction ($\mu$) of the aircraft braking system is often a difficult task.

Such algorithms usually take only one input, i.e., wheel velocity (Vw), and determine a reference velocity (Vref) with an apparatus. Then the Vref and Vw signals pass through the PID control logic, which generates a command signal. The command signal is supplied to a hydraulic servo valve and the output of servo valve, fluid pressure generates a brake torque through a brake. The algorithms show good antiskid performance—robustness and adaptability.

In spite of success of the PID type controller, related industry engineers and researchers have been continuously investigating other control schemes, partially because of difficulty in antiskid braking control parameter tuning. A need therefore still exists for an antiskid braking controller that can facilitate and shorten the process of antiskid braking control parameter tuning. The present invention meets these and other needs.

SUMMARY OF THE INVENTION

Briefly, and in general terms, the present invention provides for a sliding integral proportional (SIP) controller for aircraft antiskid braking control that improves and shortens the time required for antiskid braking control parameter tuning, and that also provides higher braking efficiency, robustness, and adaptability, since the antiskid braking control parameters to be tuned are adjusted based on an accurate adaptive threshold and an velocity error ratio or modified slip ratio ($S_{mod}$) signal with an estimated net wheel torque, a few integral gains, and a proportional gain. The proposed SIP controller requires only one input, and shows excellent braking efficiencies, robustness, and adaptability with only a fraction of tuning effort and time.

The present invention accordingly provides for a sliding, integral, and proportional (SIP) controller for providing anti-skid braking control for an aircraft. The SIP controller includes a reference velocity subsystem generating a reference velocity signal based upon an input wheel velocity signal; a velocity error ratio subsystem generating a modified slip ratio signal ($S_{mod}$) based upon a ratio of the difference between the reference velocity and the wheel velocity to the reference velocity; and a main controller subsystem receiving the reference velocity signal and the modified slip ratio signal, and generating a control command output signal indicative of a command braking pressure.

In one embodiment, the reference velocity subsystem receives a plurality of sampled wheel velocity signals, determines a minimum value of the sampled wheel velocity signals, and compares the minimum value with an individual wheel velocity signal. If the minimum value of the sampled wheel velocity signals is greater than the wheel velocity signal, a predetermined desired reduction amount is subtracted from the minimum value of the sampled wheel velocity signals and the result is output as the reference velocity of the reference velocity subsystem. Otherwise the wheel velocity signal is output as the reference velocity of the reference velocity subsystem. In one aspect, the sampled wheel velocity signals have a predetermined fixed sampling time. In a present embodiment, the modified slip ratio signal ($S_{mod}$) is determined based upon the equation:

$$S_{mod} = \frac{Velerror}{Vref}$$

where $S_{mod}$ is the velocity error ratio or modified slip ratio, Vref is the reference velocity in radians per second, and Velerror is the velocity error in radians per second, determined from the equation Vref−Vw, where Vw is the wheel velocity in radians per second.

In a present embodiment, the main controller subsystem includes a one dimensional sliding mode controller subsystem to determine an estimated net wheel torque signal; an adaptive threshold subsystem for generating an adaptive threshold based upon the modified slip ratio signal ($S_{mod}$) and a clock signal; a first integral gain subsystem for comparing the estimated net wheel torque signal with the adaptive threshold to determine dominance between the tire drag torque and braking torque, and outputting a corresponding gain value; a second integral gain subsystem exponentially generating a deep skid signal (deep_skid) when the $S_{mod}$ signal is greater than a predetermined limit and a change in wheel velocity indicates a deep skid situation; a third integral gain subsystem to avoid $S_{mod}$ signals that are too small or negative and to modify the initial braking command signal; a proportional controller subsystem generating an output signal to prevent sudden deep skids; and a pressure limiter for limiting the command braking pressure. In one aspect of the invention, the output of the main controller subsystem is a command signal indicative of a torque, which is converted to a command brake pressure signal by multiplication of a predetermined gain.

The estimated net wheel torque may be determined based upon the velocity estimation error. One-dimensional sliding surface condition takes a form as:

$$\frac{1}{2}\frac{d}{dt}s^2 = s\frac{\partial Vref}{\partial t} - \frac{Gain2}{Imw}|s| \qquad (1)$$

where $s=Vref-\hat{V}$, Vref is the reference velocity in radians per second, $\hat{V}$ is the observed or estimated wheel velocity in radians per second, Gain2 is determined as the largest possible net wheel torque in ft-lbs, and Imw is the wheel/tire/brake mass moment of inertia in slug-ft$^2$. The equation (1) is always less than zero, and thus, the sliding condition is satisfied. The net wheel torque signal may be determined according to the equation:

$$\frac{\partial \hat{V}}{\partial t} = \frac{Gain2}{Imw}sgn(s) \qquad (2)$$

where sgn(s) is the sign of s. The net wheel torque signal optionally may be determined according to the equation:

$$NWTe=DF \times sgn(s) \times Gain2 \qquad (3)$$

where NWTe is the estimated net wheel torque in ft-lbs, and DF is a discrete filter of time constant, 0.1 sec. The low pass filter DF may be defined according to the equation:

$$DF = \frac{0.04877}{z-0.9512}$$

where z is a complex variable.

In one embodiment of the invention, a plurality of skid levels are established to effectively maintain a tire drag friction coefficient ($\mu$) approaching the peak value of $\mu$ without undesirable deep skid. In one present aspect, three skid levels are established. Thus, for example, if the $S_{mod}$ signal exceeds a first skid level threshold, the adaptive threshold increases to a second skid level threshold to accommodate a braking torque and prevent a slip overshoot by a predetermined rate; if the $S_{mod}$ signal is reduced below the second skid level threshold, the threshold decreases to supply an appropriate braking command and maintain the slip at the peak of $\mu$; and the adaptive threshold becomes a third skid level threshold greater than the second skid level threshold and the $S_{mod}$ signal when the runway condition is very dry and tire drag coefficient is more than a predetermined threshold drag coefficient value, to generate a rapid initial braking command signal. In one present aspect, if the tire drag coefficient value is high (more than 0.5), then the rapid initial braking command signal is generated for approximately 0–1.5 seconds period after braking is initiated.

In a present embodiment, the first integral gain subsystem outputs a first positive gain value as the integral gain output if the estimated net wheel torque is greater than or equal to the adaptive threshold, indicating that the tire drag torque is dominant, and outputs a second negative gain value as the integral gain output if the estimated net wheel torque is less than the adaptive threshold.

In another present aspect of the invention, if $S_{mod}$ is greater than the deep skid limitation (Slim) of the $S_{mod}$ signal, and if the wheel velocity (Vw) is less than an immediately previous wheel velocity then the deep skid signal (deep skid) is determined according to the following equation:

$$deep\_skid=Ta3*\exp(u) \qquad (4)$$

where Ta3 is the first coefficient, and is a changing negative variable determined in a look-up table based upon the reference velocity, and u is the $S_{mod}$ skid level determined by the following equation:

$$u = \frac{(S_{mod} - S_{\lim})}{0.01}$$

In another aspect, the variable Ta3 changes to approximately zero at a predetermined reference velocity, causing an increase in the brake pressure and wheel lock-up. If the wheel velocity (Vw) is greater than or equal to an immediately previous wheel velocity when $S_{mod}$ is greater than or equal to Slim, then a second positive coefficient Ta3a is substituted for Ta3. In another aspect, if $S_{mod}$ is less than a constant value (Sneg), and if the elapsed time from the initiation of braking is less than about 1 second, then the output of the third integral gain subsystem is a predetermined constant, multiplied by a predetermined gain. In another present aspect, if $S_{mod}$ is less than a predetermined maximum threshold, the output signal of the proportional controller subsystem is zero.

In another present embodiment, if the product of the reference velocity (Vref) and the tire rolling radius is less than a predetermined threshold (Pdropout), the output signal of the proportional controller subsystem is a predetermined constant. If the product of the reference velocity (Vref) and the tire rolling radius is greater than or equal to the predetermined threshold (Pdropout), then the output signal of the proportional controller subsystem is the product of the velocity error and a predetermined negative gain. In another present aspect of the invention, the pressure limiter limits the command braking pressure between about 0 and about 3000 psi.

In another present embodiment, the invention further comprises a look-up table for converting the control command output signal indicative of the command braking pressure to a control command indicative of the command control current. In a present aspect, the look-up table describes a nonlinear pressure vs. current relationship. In another present embodiment, the invention further comprises a current limiter for limiting the command control current up to about 60 mA.

The present invention also provides a method for providing sliding, integral, and proportional anti-skid braking control for an aircraft having a plurality of tires and brakes. An input wheel velocity signal is provided, and a reference velocity signal is generated based upon the input wheel velocity signal. A modified slip ratio signal ($S_{mod}$) is then generated based upon a ratio of the difference between the reference velocity and the wheel velocity to the reference velocity, and a control command output signal indicative of a command braking pressure is generated based upon the reference velocity signal and the modified slip ratio signal. In a present aspect of the method, a plurality of sampled wheel velocity signals are provided, and a minimum value of the sampled wheel velocity signals is determined. The minimum value is compared with individual wheel velocity signals, and if the minimum value of the sampled wheel velocity signals is greater than an individual wheel velocity signal, a predetermined desired reduction amount is subtracted from the minimum value of the sampled wheel velocity signals and the result is output as the reference velocity. Otherwise the wheel velocity signal is output as the reference velocity. In a present aspect of the method, the sampled wheel velocity signals have a predetermined fixed sampling time.

In another aspect of the method of the invention, an estimated net wheel torque signal is determined, an adaptive threshold is generated based upon the modified slip ratio signal ($S_{mod}$) and a clock signal, the estimated net wheel torque signal is compared with the adaptive threshold to determine dominance between the tire drag torque and braking torque, and a corresponding first integral gain value is output. A deep skid signal (deep_skid) is exponentially generated when the $S_{mod}$ signal is greater than a predetermined deep slid limitation (Slim) and wheel velocities indicate a deep skid situation, based upon the modified slip ratio signal ($S_{mod}$), the wheel velocity signal (Vw), the reference velocity signal (Vref), the tire rolling radius, a predetermined deep skid limitation (Slim) of the $S_{mod}$ signal, and first and second function coefficients. The initial braking command signal is modified to avoid $S_{mod}$ signals that are too small or negative; an output signal is generated to prevent sudden deep skids; and the command braking pressure is limited to a maximum amount.

The present invention also provides for a method for determining braking efficiency of an aircraft braking system independent of the specific conditions. A new $\mu$ efficiency ($\eta$) is determined based upon an antiskid braking efficiency ($\eta_b$), average braking force (A) of all the non-braking forces acting to stop, or accelerate the aircraft, and the average braking force (B) of the aircraft braking system, according to the following equation:

$$\eta = \frac{A + \mu_b \cdot B}{A + B} \quad (6)$$

where A is the force of all the non-braking forces acting to stop, or accelerate the aircraft; B is the force of the aircraft braking system, and $\mu_b$ is the antiskid braking efficiency, determined as the actual tire drag coefficient $\mu$ divided by the peak tire drag coefficient $\mu$.

These and other aspects and advantages of the invention will become apparent from the following detailed description and the accompanying drawings, which illustrate by way of example the features of the invention.

DETAILED DESCRIPTION OF THE PREFERRED EMBODIMENTS

While aircraft brake control systems typically deal with various conditions such as aerodynamics, landing gear dynamics, $\mu$-slip profile, different landing conditions, and the like, a major problem with the use of such controllers has been appropriate tuning of parameters for the controller to provide for efficient operation of such controllers in different landing conditions that affect the tire-runway coefficient of friction ($\mu$) of the aircraft braking system.

As is illustrated in the drawings, the invention is embodied in a sliding, integral, and proportional (SIP) controller for aircraft antiskid brake control systems that utilizes a one dimensional sliding controller combined with an adaptive threshold subsystem, integral gains, and a proportional gain for providing anti-skid braking control. A reference velocity signal is used as an input of a sliding mode controller-subsystem to estimate a net wheel torque signal. A modified slip ratio signal ($S_{mod}$) is generated by a velocity error ratio subsystem, and a deep skid signal is generated exponentially when the $S_{mod}$ signal is greater than a given limit and wheel velocities indicate a deep skid situation.

The controller of the invention has been developed based on one-dimensional sliding control theory (Slotine et al., 1991) and combined with an adaptive threshold subsystem, a few integral gains and a proportional controller.

Figure 1:
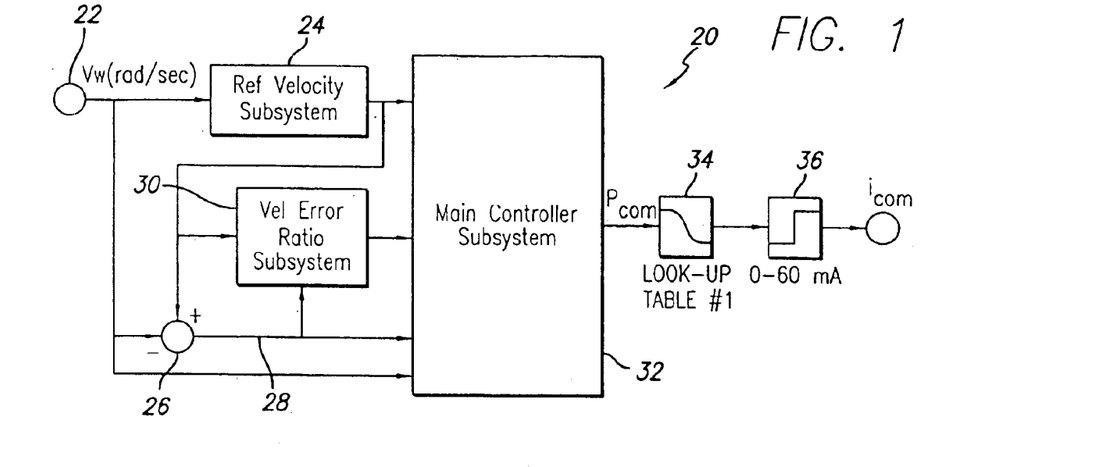
FIG. 1 is a schematic diagram of a sliding integral proportional (SIP) controller according to the present invention.

Referring to FIG. 1, the SIP controller 20 receives only one external input, the wheel velocity (Vw), typically provided by a wheel speed transducer 22 operatively connected to a wheel of an aircraft (not shown), and the reference velocity (Vref) is calculated in a reference velocity subsystem 24 based on the wheel velocity. The reference velocity subsystem unit takes, for example, 10 sampled signals with an appropriate fixed sampling time from the input-wheel velocity signal and a minimum value is chosen. This minimum value is compared with a wheel velocity signal. If the value is greater than the wheel velocity signal, an appropriate reduction amount is subtracted and the result is used as a reference velocity; otherwise, the wheel velocity goes to the output of the subsystem unit.

The wheel velocity (Vw) is subtracted from the reference velocity at a summing junction 26, resulting in a velocity error signal 28 (Velerror) which is received by a velocity error ratio subsystem 30. The velocity error (Velerror) is measured in radians per second, and is determined according to the equation:

Velocity Error (rad/sec)=Vref-Vw

Figure 2:
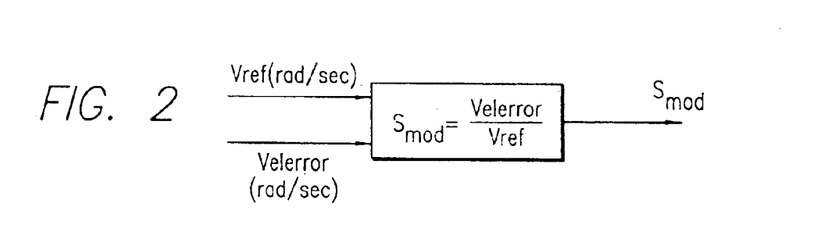
FIG. 2 is a schematic diagram of the velocity error ratio subsystem of the controller of FIG. 1.

As is illustrated in FIG. 2, the velocity error ratio subsystem generates a velocity error ratio, also referred to as the modified slip ratio ($S_{mod}$), according to the following equation:

$$S_{mod} = \frac{Velerror}{Vref}$$

Since the aircraft velocity signal (Vac) is not measured in the present antiskid braking system, accurate slip (Vac-Vw) or slip ratio (Vac-Vw)/Vac are not utilized. Thus, the velocity error ratio or modified slip ratio ($S_{mod}$) is calculated to obtain the adaptive threshold and integral gains, instead.

In addition to the reference velocity subsystem and velocity error ratio subsystem, as is illustrated in FIG. 1, the SIP controller includes a main controller subsystem 32, a lookup table #1 (34), and a current limiter 36 yielding the final braking command current $i_{com}$. The $S_{mod}$, Vref, Vw and Velerror signals are the major inputs of the main controller subsystem, the output of which is the control command current $i_{com}$. The command pressure, $P_{com}$ is converted to $i_{com}$ through the look-up table #1, which describes a non-linear pressure vs. current relationship.

Figure 3:
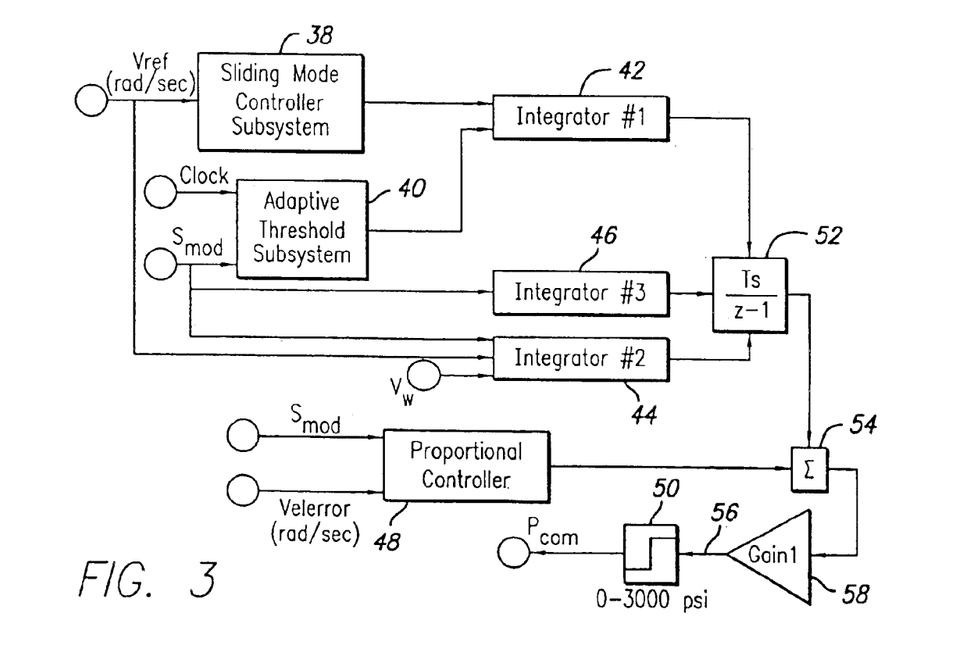
FIG. 3 is a schematic diagram of the main controller subsystem of the controller of FIG. 1.

Referring to FIG. 3, the main controller comprises a sliding mode controller subsystem 38, an adaptive threshold subsystem 40, first, second and third integrator subsystems 42, 44, 46, a proportional controller subsystem 48, and a pressure limiter 50. The outputs of the three integrator subsystems are summed at a first summer 52 over a period defined by $$\frac{Ts}{z-1},$$

where Ts is a control cycle time, and z is a complex variable. The output of the proportional controller is summed with the output of the first summer at a second summer 54, yielding an output of the main controller subsystem. The output of the main controller subsystem is dimensionally torque, and is converted to a pressure signal 56 by multiplication of Gain1 58, after which the output pressure signal ($P_{com}$) is limited by the pressure limiter between 0 and 3000 psi.

Sliding Mode Controller

Figure 4:
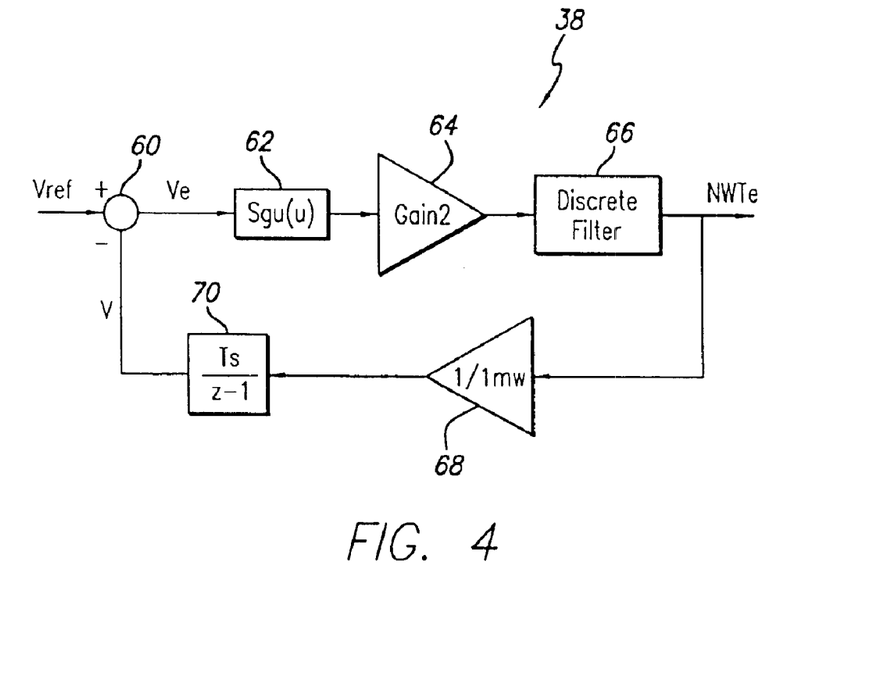
FIG. 4 is a schematic diagram of the sliding mode controller subsystem of the controller of FIG. 1.

Referring to FIGS. 3 and 4, the reference velocity (rad/sec) signal is received by the sliding mode controller subsystem as an input for generating a corresponding net wheel torque (NWTe) signal (in ft-lbs.) input to the first integrator subsystem.

To design a successfully stable sliding mode controller, estimation error vectors need to slide towards zero as quickly as possible along a series of hyper plane intersections (Slotine et al., 1991). In this controller, a one-dimensional sliding surface condition is met, because only one estimation error (Ve) is obtained. The estimated net wheel torque may be determined based upon the velocity estimation error, i.e., $Ve=V_{ref}-\hat{V}$ One dimensional sliding surface condition is expressed as:

$$\frac{1}{2}\frac{d}{dt}s^2 = s\frac{\partial Vref}{\partial t} - \frac{Gain2}{Imw}|s| \qquad (1)$$

where $s=Vref-\hat{V}$, Vref is the reference velocity in radians per second, $\hat{V}$ is the observed or estimated wheel velocity in radians per second, Gain2 is determined as the largest possible net wheel torque in ft-lbs, and Imw is the wheel/tire/brake mass moment of inertia in slug-ft$^2$.

Referring to FIG. 4, s is determined in a third summer 60 as the difference between the reference velocity and the observed or estimated wheel velocity, and s is input to block 62, the output of which is amplified by Gain2 at 64. The factor Gain2 is dimensionally a torque, and the equation (1) is always less than zero. Therefore, the sliding condition is satisfied. By assessing Gain2 as the largest possible torque, the wheel dynamics for estimating wheel velocity and NWTe may be expressed as $$\frac{\partial \hat{V}}{\partial t} = \frac{Gain2}{Imw}sgn(s) \qquad (2)$$

where sgn(s) is the sign of s.

A discrete filter (DF) 66 of time constant, 0.1 sec, receiving the output of Gain2 and defined, for example, by a function such as $$DF = \frac{0.04877}{z-0.9512},$$

may be used as a low pass filtering means, according to the equation:

$$NWTe=DF\times sgn(s)\times Gain2 \qquad (3)$$

where NWTe is the estimated net wheel torque in ft-lbs, and DF is a discrete filter of time constant, 0.1 sec. The estimated net wheel torque signal is received as feedback by amplifier 68, and integrated over a period defined by block 70 to provide the observed or estimated wheel velocity $\hat{V}$ to summer 60.

Adaptive Threshold

Referring to FIG. 3, the modified slip ratio signal ($S_{mod}$) and a clock signal are injected as two inputs to the adaptive threshold subsystem, that generates an adaptive threshold as an input to the first integrator subsystem.

To effectively maintain a tire drag friction coefficient ($\mu$) at the vicinity of the peak value of without undesirable deep skid, three skid levels are established such as skid-level 1, skid-level 2, and skid-level 3 in the $\mu$ vs. $S_{mod}$ configuration. If a $S_{mod}$ signal reaches skid-level 1 and exceeds the level, the threshold increases to accommodate a braking torque and prevent a slip overshoot by a predetermined rate. If the $S_{mod}$ signal is reduced below skid-level 2, the threshold decreases to supply an appropriate braking command and maintain the slip at the peak of $\mu$.

To generate a rapid initial braking command signal, such as when the runway condition is very dry and tire drag coefficient is high (for example, more than 0.5), the skid-level 3 is established. The level needs to be a little higher than the other two skid levels and $S_{mod}$ signal for the initial 0–1.5 seconds period after braking is initiated.

The First Integral Gain Subsystem

Figure 5:
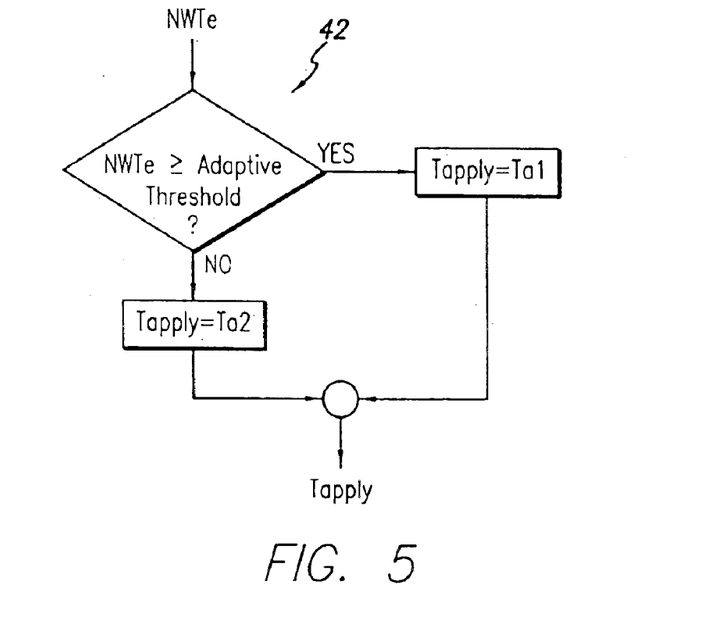
FIG. 5 is a schematic diagram of the first integrator of the controller of FIG. 1.

Referring to FIGS. 3 and 5, the output of sliding mode controller, NWTe, is compared with the adaptive threshold in the first integral gain subsystem 42 to evaluate dominance between the tire drag torque and braking torque. Once the dominance is evaluated, a corresponding gain value ($T_{apply}$) is determined as the output of the subsystem. For example, if NWTe is greater than the adaptive threshold, that is, the tire drag torque is dominant, then a positive gain value Ta1 goes to output of the subsystem; if NWTe is less than the adaptive threshold, in other words the braking torque is being applied excessively, then a negative gain value Ta2 is supplied as an integral gain.

Although only one of two gains is determined in the subsystem through the evaluation of torque dominance using the adaptive threshold, the system operates to modulate a pressure bias.

The Second Integral Gain Subsystem

Figure 6:
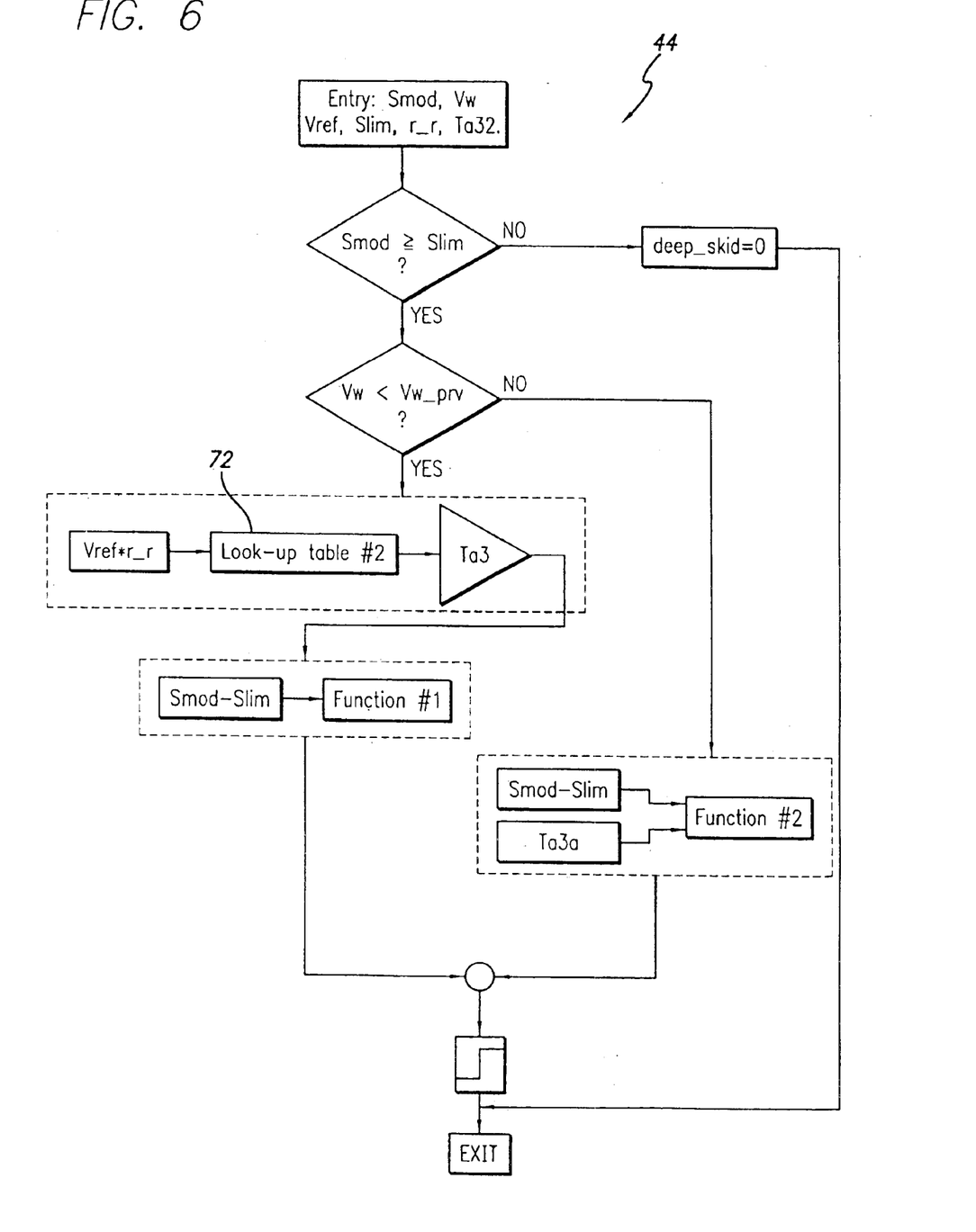
FIG. 6 is a schematic diagram of the second integrator of the controller of FIG. 1.

Referring to FIGS. 3 and 6, the inputs of the second integral gain subsystem are $S_{mod}$, Vw, Vref, r_r (the tire rolling radius in ft), Slim (the deep skid limitation in $\mu$ vs.

$S_{mod}$ configuration), a first coefficient Ta3, and a second coefficient Ta3a. The output is a deep skid signal (deep_skid).

Figure 9A:
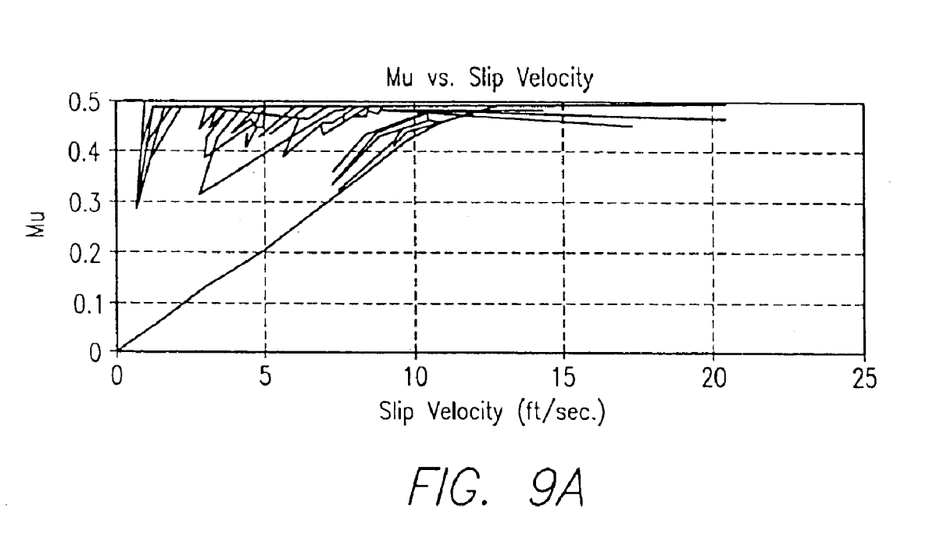
FIG. 9A is a graph of the Mu ($\mu$) vs. Slip Velocity for the aircraft B717 medium landing and $\mu$=0.5.
Figure 9B:
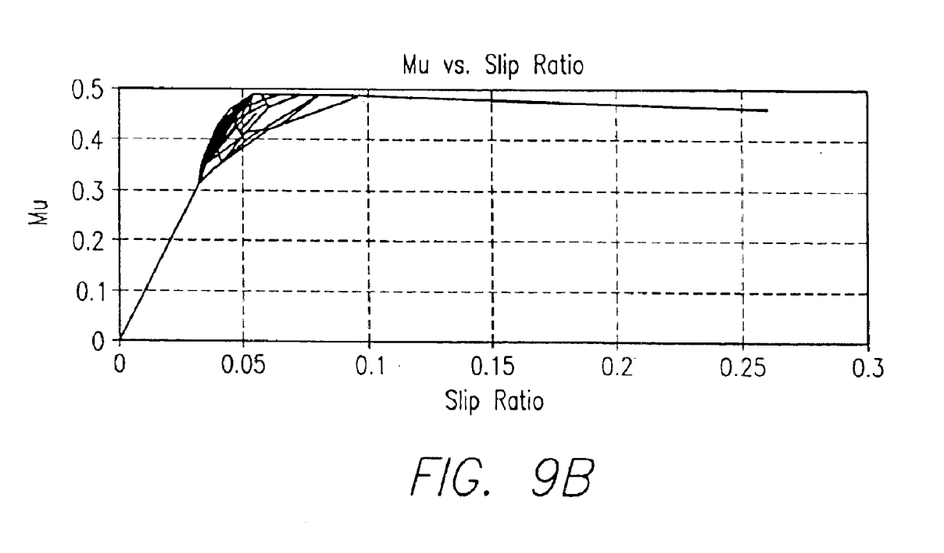
FIG. 9B is a graph of the Mu ($\mu$) vs. Slip ratio for the aircraft B717 medium landing and $\mu$=0.5.

Referring to FIG. 9B, when the abscissa of vertex of accurate $\mu$ vs. slip ratio is 0.056, the corresponding $S_{mod}$ limitation may be chosen as 0.038 and this skid limitation is termed as Slim here. If the $S_{mod}$ is greater than this limitation and Vw is less than Vw_prv (previous Vw), then the deep skid signal is released by the exponential function #1.

$$\text{Function \#1: } deep\_skid = Ta3 * \exp(u) \quad (4)$$

where $$u = \frac{(Smod - Slim)}{0.01}$$

The deep skid (DS) signal amplifies exponentially depending on the $S_{mod}$ skid level, u. Furthermore, Ta3 is not a constant but a changing negative variable along the reference velocity, which is determined in a look-up table #2 72. The coefficient Ta3 is a variable that changes to approximately zero at a certain Vref level (P_dropout), i.e., Ta3=0, if Vref$\leq$P_dropout. This causes the brake pressure increase and wheel lock-up, when the Vref reaches the P_dropout.

In anti-skid control, the wheel velocity is often quite close to the aircraft velocity immediately after a large decrease in brake pressure, which may result in a low braking efficiency. To remedy this, the wheel velocity (Vw) is monitored in discrete intervals, with the wheel velocity (Vw) of a given interval being compared with a wheel velocity Vw_prv of an immediately previous interval, under the condition of $S_{mod} \geq$ Slim. If Vw is greater than or equal to Vw_prv, then a different positive coefficient Ta3a is incorporated into the exponential function #2.

$$\text{Function \#2: } deep\_skid = Ta3a * \exp(u) \quad (5)$$

The Third Integral Gain Subsystem

Figure 7:
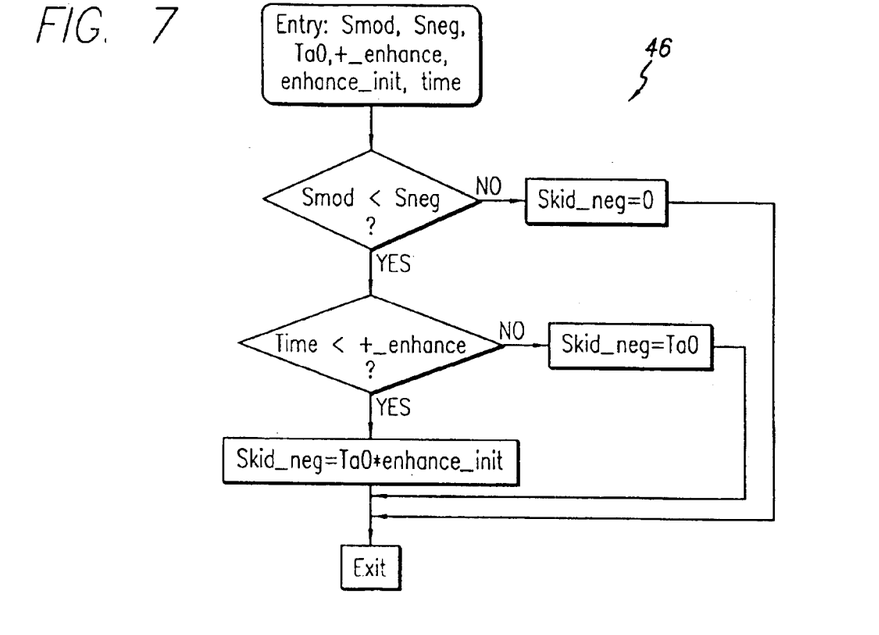
FIG. 7 is a schematic diagram of the third integrator of the controller of FIG. 1.

Referring to FIGS. 3 and 7, to avoid $S_{mod}$ signals that are too small or negative, a simple logic is utilized in the third integral gain subsystem, illustrated in the flow diagram of FIG. 7. If $S_{mod}$ is less than a constant value (Sneg), then the output skid_neg=Ta0. Ta0 is a predetermined constant. To enhance the initial braking command signal within about 0 to 1.0 second, one device is needed besides the adjustment of skid_level3 of the adaptive threshold subsystem, that is, the constant Ta0 is multiplied by a gain (enhance_init), and thus an output signal (Skid_neg) is generated by the third integral gain subsystem.

The Proportional Controller

Figure 8:
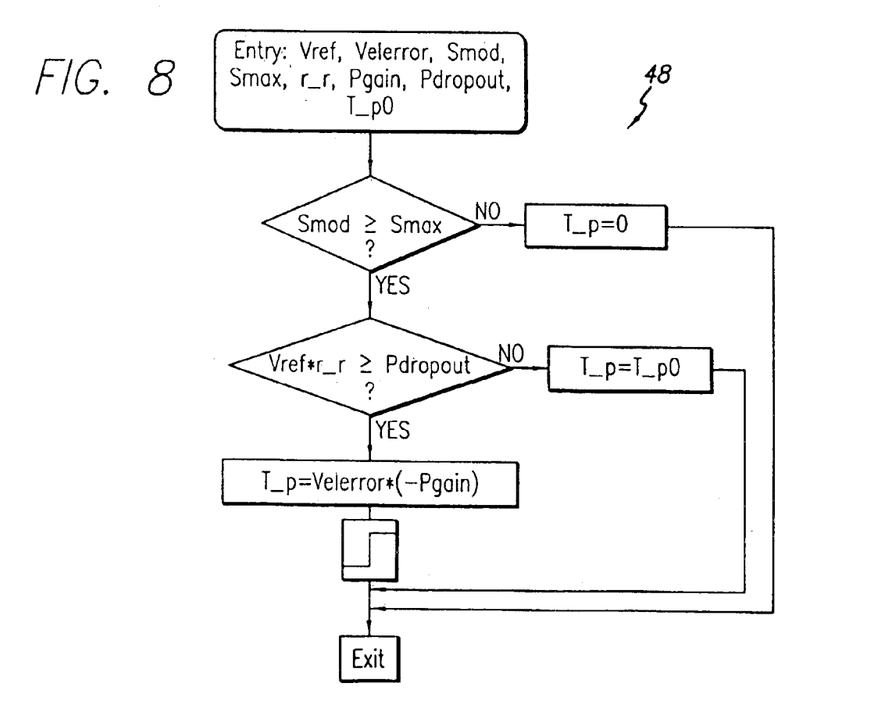
FIG. 8 is a schematic diagram of the proportional controller subsystem of the controller of FIG. 1.

Referring to the flow chart illustrated in FIG. 8, a proportional controller 48 is incorporated into the SIP controller to prevent sudden deep skids, which are often observed in aircraft antiskid braking simulations and flight test data, even under constant $\mu$ runway conditions.

One feature of the proportional controller that is different from a conventional proportional controller is that the proportional control action occurs only when the Vref is above a certain level (Pdropout). If the Vref reaches Pdropout and proceeds below it, then the output changes to a constant value (T_p0), and this also helps a necessary rapid wheel lock-up near dead stop as the coefficient Ta3 drops to zero in the third integral gain subsystem.

FIGS. 9A and 9B illustrate some antiskid physics obtained for the aircraft B717 medium landing and $\mu$=0.5. FIG. 9A demonstrates that the tire-runway coefficient of friction ($\mu$) changes as the aircraft slip velocity decreases. The peak $\mu$ is located around the slip velocity of 12.5 ft/sec. However, from FIG. 9B it can be seen that the $\mu$ vs. slip ratio curve does not vary significantly during the braking and aircraft deceleration. From FIGS. 9A and 9B, it may be observed that the SIP controller manages antiskid performance near the peak $\mu$ (0.5) or front side of the curves well. In FIG. 9B, the peak $\mu$ is found at the slip ratio of about 0.056.

For the main landing gear dynamic model, two D.O.F. nonlinear lagrangian equations based on a T-shape gear configuration are incorporated in the Simulation model. The Simulation shows a close correlation between the brake torque and gear walk stability. It is noted that sudden drops of brake torque amplifies slightly the gear walk velocity.

The SIP controller of the invention has been tested for broad range of tire-runway friction coefficients for B717 parameters in a non real time environment. The simulation results show high efficiency, i.e, 97.4% for Mumax=0.1, 94.3% for Mumax 0.5, 92.4% for Mu-step 0.4-0.2. The dynamic model of aircraft, wheel, main and nose landing gears, hydraulic system, torque data, and aerodynamic models have been carefully examined and incorporated in the closed loop control model to test the SIP controller and to evaluate antiskid performance.

The main landing gear stability has been also tested with an external pulse force by the assumption that fore-aft gear damping ratio=0 and up to −15% of critical damping. Very excellent damping effects have been observed even for −15% damping ratio under the condition that a horizontal axle acceleration would be available and added to the control signal output.

The simulations have been performed for the B717 aircraft parameters, T-shape main landing gears, a hydraulic system, and brakes in a non real time environment.

The simulation results show a successful performance with high efficiencies for various tire drag friction coefficients ($\mu$) with only a few tuning parameters.

TABLE 1

| Braking Efficiency, B717 Medium Landing | |
|---|---|
| $\mu$ | Efficiency* |
| 0.1 | 97.4% |
| 0.5 | 94.3% |
| Stepped $\mu$ 0.4 − 0.2 | 92.4% |

In table 1, the Efficiency* is a higher efficiency by comparison among the cumulative distance efficiency and new $\mu$ efficiency, explained below.

Braking Performance

The New $\mu$ Efficiency Method:

The new $\mu$ efficiency ($\rho$) of the present invention, and cumulative distance efficiency (described in the Hydro-Aire Default Simulation Plan R 1397) are interrelated for any set of conditions.

$$\eta = \frac{A + \mu_b \cdot B}{A + B} \quad (6)$$

where A is the average braking force of all the non-braking (i.e. aerodynamic) forces that are acting to stop, or accelerate the aircraft, the main factors of which are flaps, spoilers, body drag, thrust reversers, wind, runway slope, and the like; B is the average braking force assuming the braking is perfect; and $\mu_b$ is the antiskid braking efficiency, actual $\mu$ divided by the peak $\mu$.

In this way, the braking performance is calculated independent of the specific conditions. The new $\mu$ efficiency method shows a lower efficiency as the overall efficiency decreases, especially for the $\mu$-step tire runway condition. However, the higher the efficiency, the smaller the difference.

Gear Stability with a Horizontal Component of Wheel Axle Acceleration:

It should be appreciated that if a wheel axle acceleration signal is available in future, the horizontal component of acceleration multiplied by a gain can be directly added to the control current output signal, which can increase the overall closed loop damping effect of the system dramatically. Excellent gear stability is expected even for negative value of fore-aft landing gear damping up to 15% of the critical damping ratio.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A sliding, integral, and proportional controller for providing anti-skid braking control for an aircraft having a plurality of tires and brakes, comprising:

a reference velocity subsystem generating a reference velocity signal (Vref) based upon an input wheel velocity signal Vw);

a velocity error ratio subsystem generating a modified slip ratio signal ($S_{mod}$) based upon a ratio of the difference between the reference velocity and the wheel velocity to the reference velocity; and a main controller subsystem receiving the reference velocity signal and the modified slip ratio signal, the main controller subsystem generating a control command output signal indicative of a command braking pressure responsive to the reference velocity signal and the modified slip ratio signal, wherein the main controller subsystem comprises:

a one dimensional sliding mode controller subsystem to determine an estimated net wheel torque signal;

an adaptive threshold subsystem for generating an adaptive threshold based upon the modified slip ratio signal ($S_{mod}$) and a clock signal;

means for summing a first integral gain based upon the estimated net wheel torque signal and the adaptive threshold, a deep skid signal (DS) based upon the modified slip ratio signal ($S_{mod}$), the wheel velocity signal (Vw), the reference velocity signal (Vref), a tire rolling radius, a predetermined deep skid limitation (Slim) of the $S_{mod}$ signal, and first and second function coefficients, and a modification of the initial braking command signal to avoid $S_{mod}$ signals that are too small or negative, to provide an output sum;

a proportional controller subsystem receiving the output sum from the means for summing and generating an output signal responsive to the output sum to prevent sudden deep skids; and a pressure limiter for limiting the command braking pressure.

2. The sliding, integral, and proportional controller of claim 1, wherein the control command output signal of the main controller subsystem is a torque.

3. The sliding, integral, and proportional controller of claim 2, wherein the torque is converted to a command brake pressure signal by multiplication of a predetermined gain.

4. A method for providing sliding, integral, and proportional anti-skid braking control for an aircraft having a plurality of tires and brakes, comprising:

providing an input wheel velocity signal;

generating a reference velocity signal based upon the input wheel velocity signal;

generating a modified slip ratio signal ($S_{mod}$) based upon a ratio of the difference between the reference velocity and the wheel velocity to the reference velocity; and generating a control command output signal indicative of a command braking pressure responsive to the reference velocity signal and the modified slip ratio signal, wherein generating a control command output signal comprises:

determining an estimated net wheel torque signal;

generating an adaptive threshold based upon the modified slip ratio signal ($S_{mod}$) and a clock signal;

summing a first integral gain based upon the estimated net wheel torque signal and the adaptive threshold, a deep skid signal (DS) based upon the modified slip ratio signal ($S_{mod}$), the wheel velocity signal (Vw), the reference velocity signal (Vref, a tire rolling radius, a predetermined deep skid limitation (Slim) of the $S_{mod}$ signal, and first and second function coefficients, and a modification of the initial braking command signal to avoid $S_{mod}$ signals that are too small or negative to provide an output sum;

receiving the output sum and generating an output signal responsive to the output sum to prevent sudden deep skids; and limiting the command braking pressure.

5. The method of claim 4, wherein the control command output signal is a torque.

6. The method of claim 5, wherein the torque is converted to a command brake pressure signal by multiplication of a predetermined gain.

* * * * *

UNITED STATES PATENT AND TRADEMARK OFFICE
CERTIFICATE OF CORRECTION

PATENT NO.         : 7,013,208 B2                                            Page 1 of 1
APPLICATION NO. : 10/754664
DATED              : March 14, 2006
INVENTOR(S)        : Park et al.

It is certified that error appears in the above-identified patent and that said Letters Patent is hereby corrected as shown below:

<u>Column 5</u>, line 28, delete "$\eta_b$" and insert --$(\mu_b)$--.

<u>Column 8,</u> line 32, after "peak value of" insert --$\mu$--.

<u>Column 10,</u> line 52, delete "$\rho$" and insert --$\eta$--.

Signed and Sealed this

Fifteenth Day of August, 2006

JON W. DUDAS
*Director of the United States Patent and Trademark Office*